Patented Nov. 9, 1937

2,098,842

UNITED STATES PATENT OFFICE 2,098,842

PREPARATION OF ACETALDEHYDE AND A CATALYST THEREFOR

Hans Walter, Frankfort-on-the-Main, Germany, assignor to Deutsche Gold- und Silber Scheideanstalt vormals Roessler, Frankfort-on-the-Main, Germany, a corporation of Germany No Drawing. Application November 13, 1935, Serial No. 49,552. In Germany May 24, 1930

8 Claims. (Cl. 260—139)

This invention relates to the manufacture of acetaldehyde and more particularly to the manufacture of this product by reacting acetylene with water vapor and a catalyst therefor.

Heretofore acetylene has been reacted with water by contacting acetylene with water or water vapor in the presence of an acidic catalyst. In this method as heretofore used catalysts comprising acids, acid salts or the like have been utilized. In the vapor phase method, it has been known to prepare a catalyst body by impregnating a suitable porous material, for example pumice and pass acetylene and water vapor mixtures over the catalyst body at a suitable temperature. In carrying out such catalytic methods heretofore, difficulty has been experienced with the formation of crotonaldehyde and/or other undesirable by products such as tarry materials and the like. In order to prevent the formation of excessive quantities of such undesirable by products ordinarily it is necessary to carry out the reaction at a relatively low temperature, e. g. not greater than 270° C.

An object of the present invention is to provide an improved catalytic method for the production of acetaldehyde by the reaction of acetylene with water vapor. A further object is to provide an improved catalyst for the reaction of acetylene and water vapor to produce acetaldehyde. Other objects will be apparent from the following description of the invention.

The above objects are attained in accordance with the present invention by reacting acetylene with water vapor at elevated temperatures in the presence of an acidic catalyst comprising activated carbon which is impregnated with an acidic catalyst material. It has been found that the use of catalysts comprising activated carbon impregnated with acidic catalysts in this reaction results in improved yields of acetaldehyde and permits the employment of much higher reaction temperatures without the formation of undesirable reaction by-products. By the use of the herein described novel catalysts, it is possible to carry out the reaction at temperatures up to about 500° C., with little or no formation of the undesirable by-products. A distinct advantage lies in utilizing relatively high reaction temperatures, since by this means the proportion of acetylene converted to acetaldehyde is correspondingly increased and thus greater amounts of the product can be produced in a shorter time and with the employment of less reaction equipment.

While the method of the present invention may be carried out at temperatures within the range of 200 to 500° C. with good results it is preferred to maintain the reaction mixture and catalyst at a temperature of about 350 to 400° C. since within this preferred temperature range the highest yields of acetaldehyde ordinarily are obtained.

In accordance with the present invention, various acidic catalyst materials which have been heretofore known or employed for the formation of acetaldehyde by the addition of water to acetylene may be employed as catalysts. Catalyst bodies suitable for the present invention may be made by impregnating active carbon with acidic catalyst materials such as phosphoric acid or various mixtures of acids and metal compounds which are suitable catalysts for the reaction. For example, the activated carbon may be impregnated with phosphoric acid or with a mixture of phosphoric acid and a metal compound preferably a compound of a metal such as zinc, cadmium or silver.

The following examples illustrate specific methods of practicing the invention and specific catalysts which have been found to be especially suitable:

Example I

A catalyst body was made by impregnating 100 grams of highly activated granular carbon with an aqueous acidic acid solution containing 40 grams of cadmium carbonate and then with 54 grams of 85% phosphoric acid. A mixture of one volume of acetylene to 20 volumes of water vapor was passed over this catalyst at a temperature of 340 to 370° C., this gaseous mixture first having been pre-heated to about 350° C. By condensation of the off gases, an aqueous solution of acetaldehyde was obtained which was practically free from crotonaldehyde or other decomposition products. The yields of aldehyde based on the amount of acetylene reacted was 90% of theory.

Example II

A catalyst was prepared by impregnating 100 grams of activated carbon with an aqueous solution containing 25 grams of silver nitrate and an acetic acid solution of 20 grams of zinc oxide and finally with 57.2 grams of 85% phosphoric acid. The acetylene water vapor mixture described in Example I, suitably pre-heated, was passed over the catalyst at a temperature of 340 to 360° C. The yield based on the acetylene reacted was more than 94% of theory; 77% of the acetylene was converted to acetaldehyde in a single passage over the catalyst.

In this example, when the velocity of the acetylene water vapor mixture passing through the reaction chamber was sufficiently high, the condensate consisted of a 16% aqueous solution of acid aldehyde. In this method, the unreacted acetylene escaping from the apparatus may of course be returned to the reaction vessel for further reaction. The reaction chamber may be constructed of suitable material such as aluminum or acid resisting steel.

Example III

A catalyst was prepared by impregnating 100 grams of highly activated granular carbon with an aqueous solution of 60 grams of syrupy phosphoric acid and then with 15 grams of zinc oxide. Over this catalyst a mixture of acetylene and water vapor was passed at a suitably high velocity, at a temperature of 450 to 500° C. The yield of acetaldehyde obtained by condensation of the off gases was around 84% of theory, based on the amount of acetylene reacted. The catalyst retained only a very small amount of crotonaldehyde.

From the above description, it is seen that novel and unexpected results are obtained by substituting activated carbon in the place of pumice and the like as support for acidic catalysts in the production of acetaldehyde by reacting acetylene with water vapor. The reason for this is not fully understood, since it would not appear that the type of catalytic support would appreciably effect the selective activity of the acidic catalyst and thereby prevent the formation of large amounts of undesirable reaction by-products, at the higher temperatures. It is known that the reaction supports heretofore used such as pumice and the like in themselves have no appreciable catalyst activity for the desired reaction. Furthermore, it has been found that activated carbon alone not only does not have the desired catalytic activity, but actually has an adverse effect. For example, if acetylene is reacted with water vapor in the presence of activated carbon as the sole catalyst at a temperature below 200° C., excessive amounts of crotonaldehyde, tar and the like are formed. If this reaction is carried out in the presence of activated carbon alone at temperatures above 200° C., the acetylene is converted almost entirely to crotonaldehyde and tarry materials. At temperatures of about 350 to 400° C., the temperature range found especially advantageous in the present invention, in the presence of carbon alone or carbon impregnated with zinc oxide but free from acidic materials, acetylene and water vapor react to form acetone almost entirely. At temperatures above 400° C., in the presence of activated carbon alone, the acetylene is converted to aromatic hydrocarbons such as benzene, naphthalene and the like. However, when the activated carbon is associated with an acidic catalyst, the acetylene and water vapor react in its presence chiefly to form acetaldehyde, without the formation of any appreciable quantity of undesirable by-products. It thus appears that the selective action of the acidic catalysts whereby the formation of acetaldehyde is favored is increased or promoted by the addition of activated carbon and at the same time, the undesirable effects caused by activated carbon when it is used alone are in some way prevented by the presence of the acidic catalyst.

I claim:

1. A process for the preparation of acetaldehyde comprising reacting water vapor with acetylene in the presence of a catalyst comprising activated carbon impregnated with phosphoric acid.

2. A process for the preparation of acetaldehyde comprising reacting water vapor with acetylene in the presence of a catalyst comprising activated carbon impregnated with phosphoric acid and containing a phosphate of at least one metal selected from the group consisting of zinc, cadmium and silver.

3. A process for the preparation of acetaldehyde comprising reacting water vapor with acetylene at a temperature of 200 to 500° C. in the presence of a catalyst comprising activated carbon impregnated with phosphoric acid.

4. A process for the preparation of acetaldehyde comprising reacting water vapor with acetylene at a temperature of about 350 to 400° C. in the presence of a catalyst comprising activated carbon impregnated with phosphoric acid and a phosphate of a metal selected from the group consisting of zinc, cadmium and silver.

5. A process for the preparation of acetaldehyde comprising reacting water vapor with acetylene at a temperature of 200 to 500° C. in the presence of a catalyst comprising activated carbon impregnated with phosphoric acid and containing a phosphate of at least one metal selected from the group consisting of zinc, cadmium and silver.

6. A process for the preparation of acetaldehyde comprising reacting water vapor with acetylene at a temperature of 350 to 400° C. in the presence of a catalyst comprising activated carbon impregnated with an acidic catalyst comprising zinc oxide and phosphoric acid.

7. An acidic catalyst body for the production of acetaldehyde by reacting acetylene with water which comprises activated carbon impregnated with phosphoric acid and a phosphate of at least one metal selected from the group comprising zinc, cadmium and silver.

8. An acidic catalyst body for the production of acetaldehyde by reacting acetylene with water which comprises activated carbon impregnated with zinc oxide and phosphoric acid.

HANS WALTER.